US012269555B2

(12) United States Patent
Hiramaru et al.

(10) Patent No.: US 12,269,555 B2
(45) Date of Patent: Apr. 8, 2025

(54) SADDLE-RIDE VEHICLE

(71) Applicant: HONDA MOTOR CO., LTD., Tokyo (JP)

(72) Inventors: Masayuki Hiramaru, Tokyo (JP); Tomohiro Suzuki, Tokyo (JP); Hiroshi Okamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 527 days.

(21) Appl. No.: 17/696,161

(22) Filed: Mar. 16, 2022

(65) Prior Publication Data
US 2022/0315157 A1 Oct. 6, 2022

(30) Foreign Application Priority Data
Mar. 31, 2021 (JP) .................................. 2021-061953

(51) Int. Cl.
*B62K 11/04* (2006.01)
(52) U.S. Cl.
CPC ..................................... *B62K 11/04* (2013.01)
(58) Field of Classification Search
CPC ..................................................... B62K 11/04
USPC ........................................................ 180/219
See application file for complete search history.

(56) References Cited

U.S. PATENT DOCUMENTS

| 10,011,314 B2 | 7/2018 | Kajio et al. |
| 2002/0144850 A1 | 10/2002 | Gogo |
| 2006/0278458 A1 | 12/2006 | Toyoda |
| 2008/0223644 A1 | 9/2008 | Theobald |
| 2011/0074129 A1* | 3/2011 | Yokoyama ........... B62K 25/283 280/124.128 |

FOREIGN PATENT DOCUMENTS

| DE | 60218239 T2 | 6/2007 |
| EP | 1 813 523 A1 | 8/2007 |
| EP | 1864901 A2 | 12/2007 |
| JP | H6-87481 A | 3/1994 |
| JP | H10-115226 | 5/1998 |

(Continued)

OTHER PUBLICATIONS

Indian Office Action dated Oct. 20, 2022 issued in corresponding Indian application No. 202244018288; English translation included (5 pages).

(Continued)

*Primary Examiner* — Lindsay M Low
*Assistant Examiner* — Omar Morales
(74) *Attorney, Agent, or Firm* — Rankin, Hill & Clark LLP

(57) ABSTRACT

The saddle-ride vehicle includes a tubular distance collar that is disposed between a one-side pivot portion and an other-side pivot portion and through which a pivot shaft is passed, the one-side pivot portion is provided with a tubular one-side collar member through which the pivot shaft is passed, the other-side pivot portion is provided with a tubular other-side collar member through which the pivot shaft is passed, the distance collar is interposed between the one-side collar member and the other-side collar member, and the distance collar is exposed outward between the one-side collar member and the other-side collar member separated from each other to the left and right, in a state where the pivot shaft is passed through the distance collar.

4 Claims, 5 Drawing Sheets

(56) References Cited

FOREIGN PATENT DOCUMENTS

| JP | 2003-127961 A | 5/2003 |
|---|---|---|
| JP | 2006-264460 A | 10/2006 |
| JP | 2006-341672 A | 12/2006 |
| JP | 2011-73589 A | 4/2011 |
| JP | 2011-148448 A | 8/2011 |
| JP | 2019-151145 A | 9/2019 |

OTHER PUBLICATIONS

Japanese Office Action dated Jan. 10, 2023 issued in corresponding Japanese application No. 2021-061953; English machine translation included (7 pages).
Indian Office Action dated Jan. 20, 2024 issued in corresponding Indian application No. 202244018288; English translation included (3 pages).
German Office Action from Corresponding German Application No. 102022106760.2, dated Apr. 9, 2024, 6 pages.

* cited by examiner

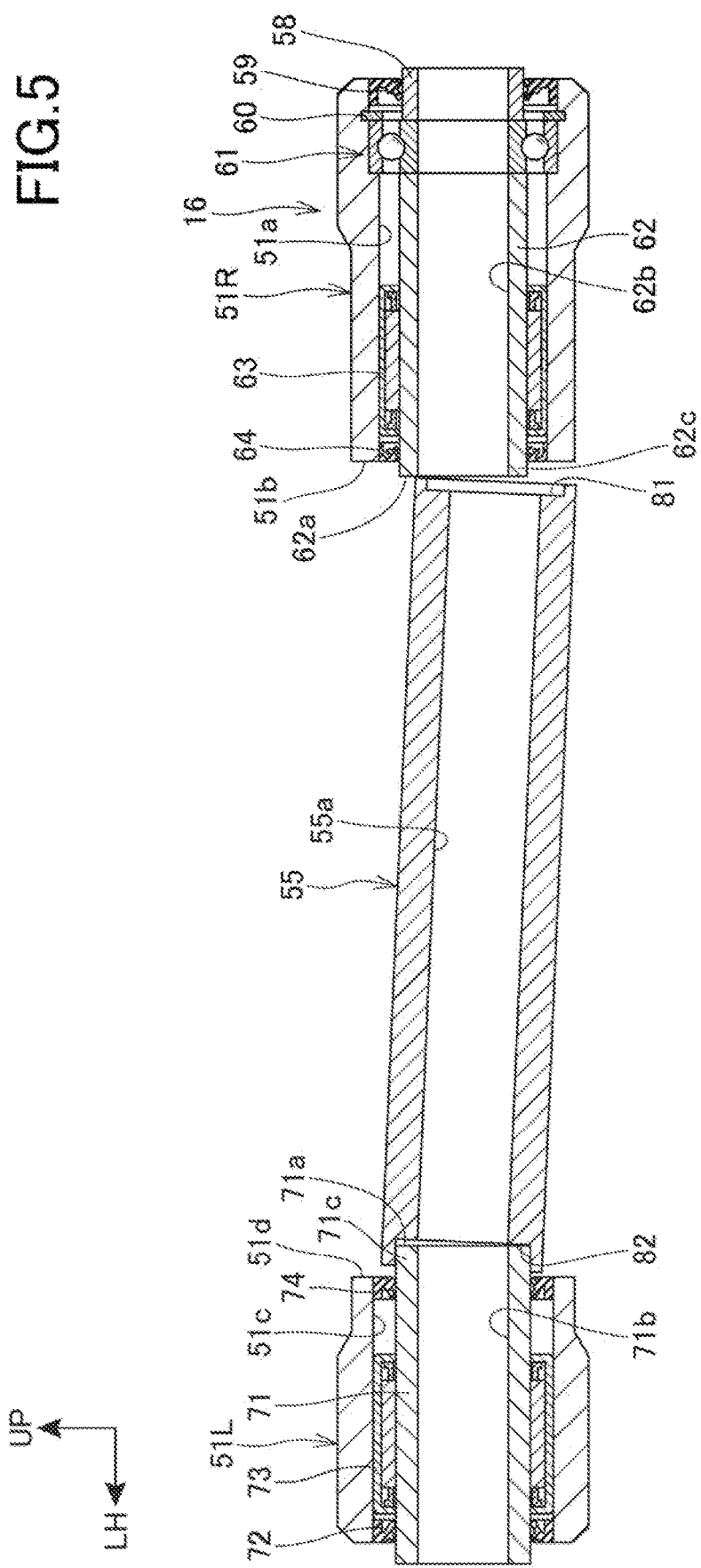

SADDLE-RIDE VEHICLE

INCORPORATION BY REFERENCE

The present application claims priority under 35 U.S.C. § 119 to Japanese Patent Application No. 2021-061953 filed on Mar. 31, 2021. The content of the application is incorporated herein by reference in its entirety.

BACKGROUND OF THE INVENTION

Field of the Invention

The present invention relates to a saddle-ride vehicle.

Description of the Related Art

In the related art, there is known a saddle-ride vehicle including a pair of left and right frames and a swing arm that is supported on the frames through a pivot shaft in a swingable manner, the swing arm including a pair of left and right pivot portions that is supported on the pivot shaft and a tubular distance collar that is disposed between the left and right pivot portions and through which the pivot shaft is passed (for example, see Japanese Patent Laid-Open No. 10-115226). In Japanese Patent Laid-Open No. 10-115226, a distance collar is supported on a hole provided in a crankcase of an engine. The distance collar is sandwiched between collar members, which are provided on the pair of left and right pivot portions, respectively, by a fastening shaft force of the pair pivot shaft.

In some cases, the swing arm in the saddle-ride vehicle may be diverted to a model different from the saddle-ride vehicle. In the model to be diverted, it is difficult to support the distance collar by the crankcase as in the above-described technique according to the related art due to, for example, the difference in shape of the crankcase.

The present invention has been made in view of such a circumstance, and an object of the present invention is to provide a saddle-ride vehicle in which a distance collar of a swing arm can be supported with a simple configuration.

SUMMARY OF THE INVENTION

A saddle-ride vehicle according to an aspect of the present invention includes: a pair of left and right vehicle body frames; and a swing arm supported on the vehicle body frames through a pivot shaft in a swingable manner, the swing arm including a one-side pivot portion, an other-side pivot portion, and a distance collar, the one-side pivot portion being provided on one side of left and right sides to be supported on the pivot shaft, the other-side pivot portion being provided on the other side of the left and right sides to be supported on the pivot shaft, the distance collar having a tubular shape and being disposed between the one-side pivot portion and the other-side pivot portion, the pivot shaft being passed through the distance collar, the one-side pivot portion being provided with a one-side collar member, the one-side collar member having a tubular shape, the pivot shaft being passed through the one-side collar member, the other-side pivot portion being provided with an other-side collar member, the other-side collar member having a tubular shape, the pivot shaft being passed through the other-side collar member, the distance collar being interposed between the one-side collar member and the other-side collar member, wherein the distance collar is exposed outward between the one-side collar member and the other-side collar member in a state where the pivot shaft is passed through the distance collar, the one-side collar member and the other-side collar member being separated from each other to left and right.

In the saddle-ride vehicle according to the aspect of the present invention, the distance collar of the swing arm can be supported with a simple configuration.

BRIEF DESCRIPTION OF THE DRAWINGS

FIG. 5 is a cross-sectional view illustrating temporary assembly of the swing arm.

DETAILED DESCRIPTION OF THE PREFERRED EMBODIMENT

Figure 1:
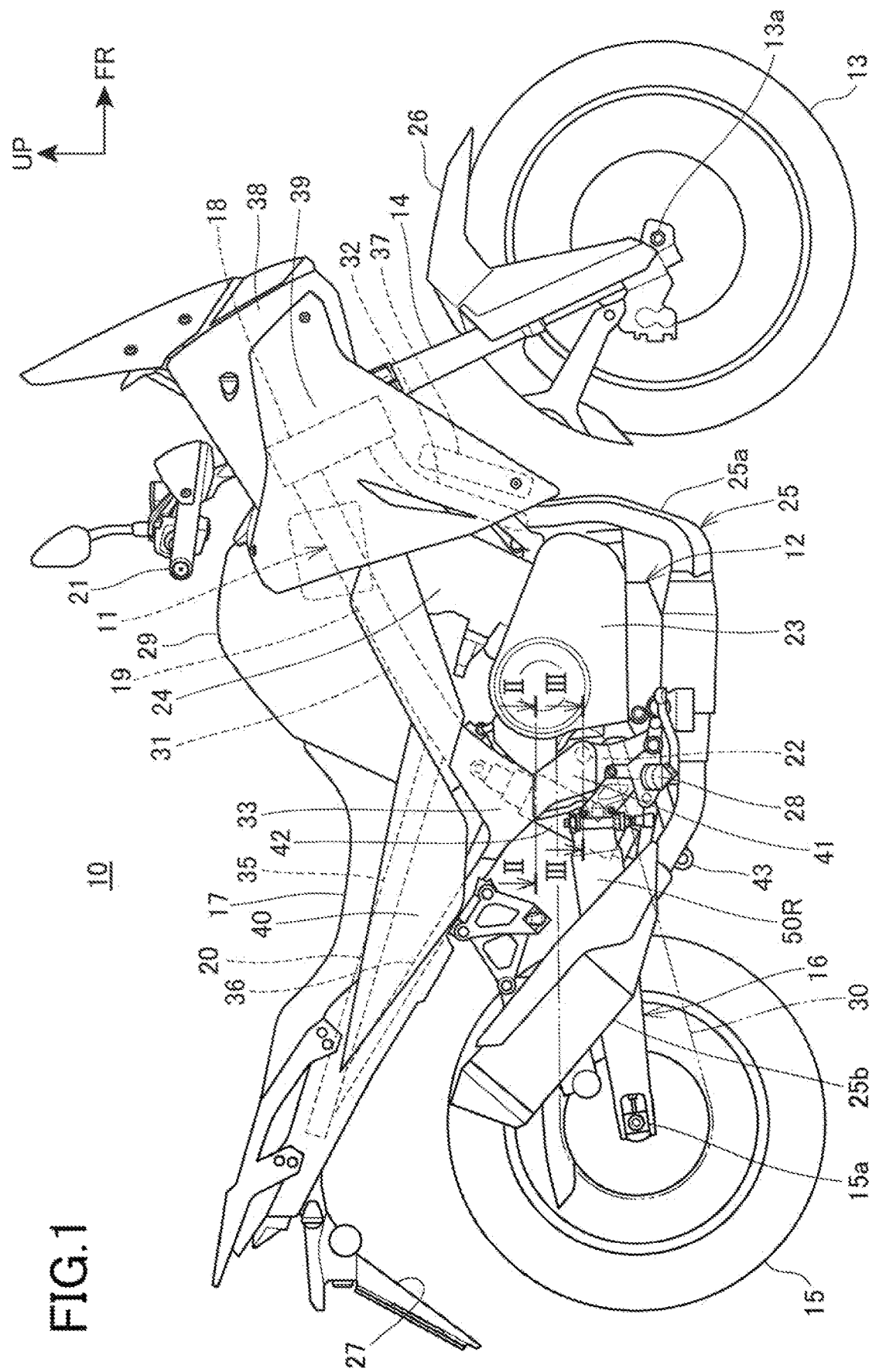
FIG. 1 is a side view of a saddle-ride vehicle according to an embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The saddle-ride vehicle 10 is a motorcycle, and the front wheel 13 and the rear wheel 15 are located at the center in the vehicle width direction.

The front frame 19 includes a pair of left and right main frames 31 extending rearward and downward from an upper part of the head pipe 18, a pair of left and right down frames 32 extending rearward and downward from a lower part of the head pipe 18, and a pair of left and right pivot frames 33 extending downward from rear end portions of the main frames 31.

The rear frame 20 includes a pair of left and right seat frames 35 extending rearward and upward from the rear end portions of the main frames 31 and a pair of left and right subframes 36 extending rearward and upward from upper end portions of the pivot frames 33 and connected to rear end portions of the seat frames 35.

The power unit 12 is disposed between the down frame 32 and the pivot frame 33 in a vehicle front-rear direction below the main frame 31.

The cylinder 24 extends upward from an upper surface of a front part of the crankcase 23.

The exhaust device 25 included an exhaust pipe 25a extending rearward from the cylinder 24 and a muffler 25b disposed on an outer side of the swing arm 16.

The drive power transmission member is an endless chain 30.

The fuel tank 29 is disposed between the seat 17 and the head pipe 18 in a vehicle front-rear direction above the main frame 31. The fuel tank 29 is supported on the main frame 31.

A radiator 37, through which cooling water of the power unit 12 passes, is disposed in front of the cylinder 24 and the down frame 32, and is mounted on the down frame 32.

The saddle-ride vehicle 10 includes, as vehicle body covers, a front cover 38 that covers the head pipe 18 from the front side, a pair of left and right front side covers 39 that cover the front part of the vehicle from the side, and a pair of left and right rear side covers 40 that cover the vehicle body below the seat 17 from the outside in the vehicle width direction.

Further, the saddle-ride vehicle 10 includes a pair of left and right frame covers 41 that cover the pivot frame 33 from the outside in the vehicle width direction.

The saddle-ride vehicle 10 includes a rear cushion 42 that attenuates swing in an up-down direction of the swing arm 16. An upper end portion of the rear cushion 42 is connected to the rear part of the vehicle body frame 11, and a lower end portion of the rear cushion 42 is connected to the swing arm 16 via a link mechanism 43.

The upper part of the rear cushion 42 is disposed between the left and right pivot frames 33.

Figure 2:
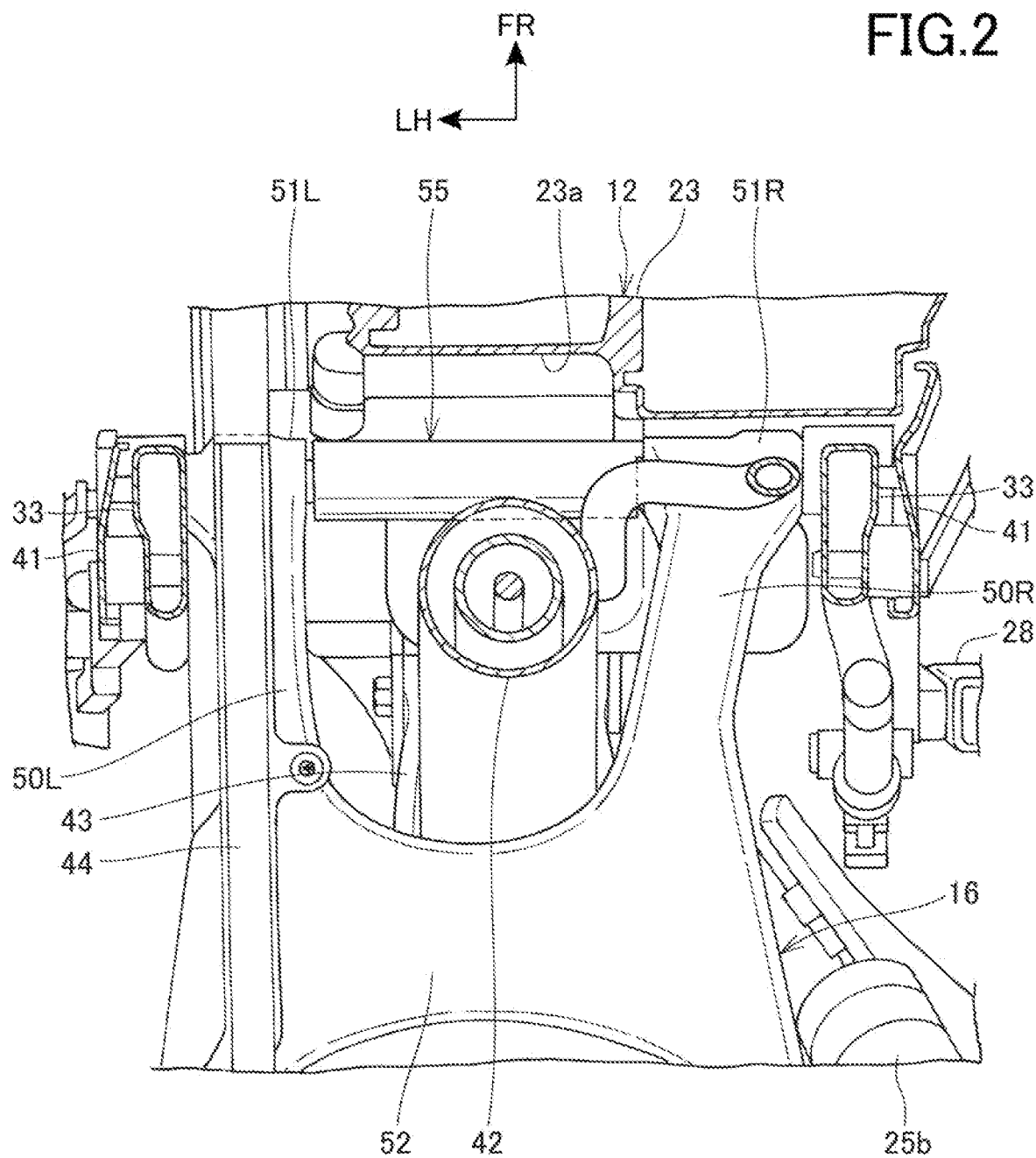
FIG. 2 is a cross-sectional view taken along line II-II in FIG. 1.

FIG. 2 is a cross-sectional view taken along line II-II in FIG. 1.

With reference to FIGS. 1 and 2, the swing arm 16 is disposed behind a rear surface portion 23a of the crankcase 23.

The swing arm 16 includes a pair of left and right arms 50L and 50R extending in the vehicle front-rear direction.

The arm 50R is disposed on one side (right side) of the left and right sides with respect to the center in the vehicle width direction. The arm 50L is disposed on the other side (left side) of the left and right sides with respect to the center in the vehicle width direction.

In addition, the swing arm 16 includes a one-side pivot portion 51R provided at a front end of the arm 50R, the other-side pivot portion 51L provided at a front end of the arm 50L, and a cross member 52 provided behind the one-side pivot portion 51R and the other-side pivot portion 51L to connect the arms 50L and 50R to each other in the vehicle width direction.

Further, the swing arm 16 includes a tubular distance collar 55 interposed between the one-side pivot portion 51R and the other-side pivot portion 51L at a front end portion of the swing arm 16.

The rear wheel 15 is disposed between the arm 50R and the arm 50L at a rear side of the cross member 52.

A lower end portion of the rear cushion 42 is connected to the link mechanism 43 on lower sides relative to the arms 50L and 50R.

The rear cushion 42 extends upward the swing arm 16 passing between the arm 50R and the arm 50L and between the distance collar 55 and the cross member 52.

A chain slider 44 is mounted on an upper surface of the arm 50L to receive a chain 30 from below.

Figure 3:
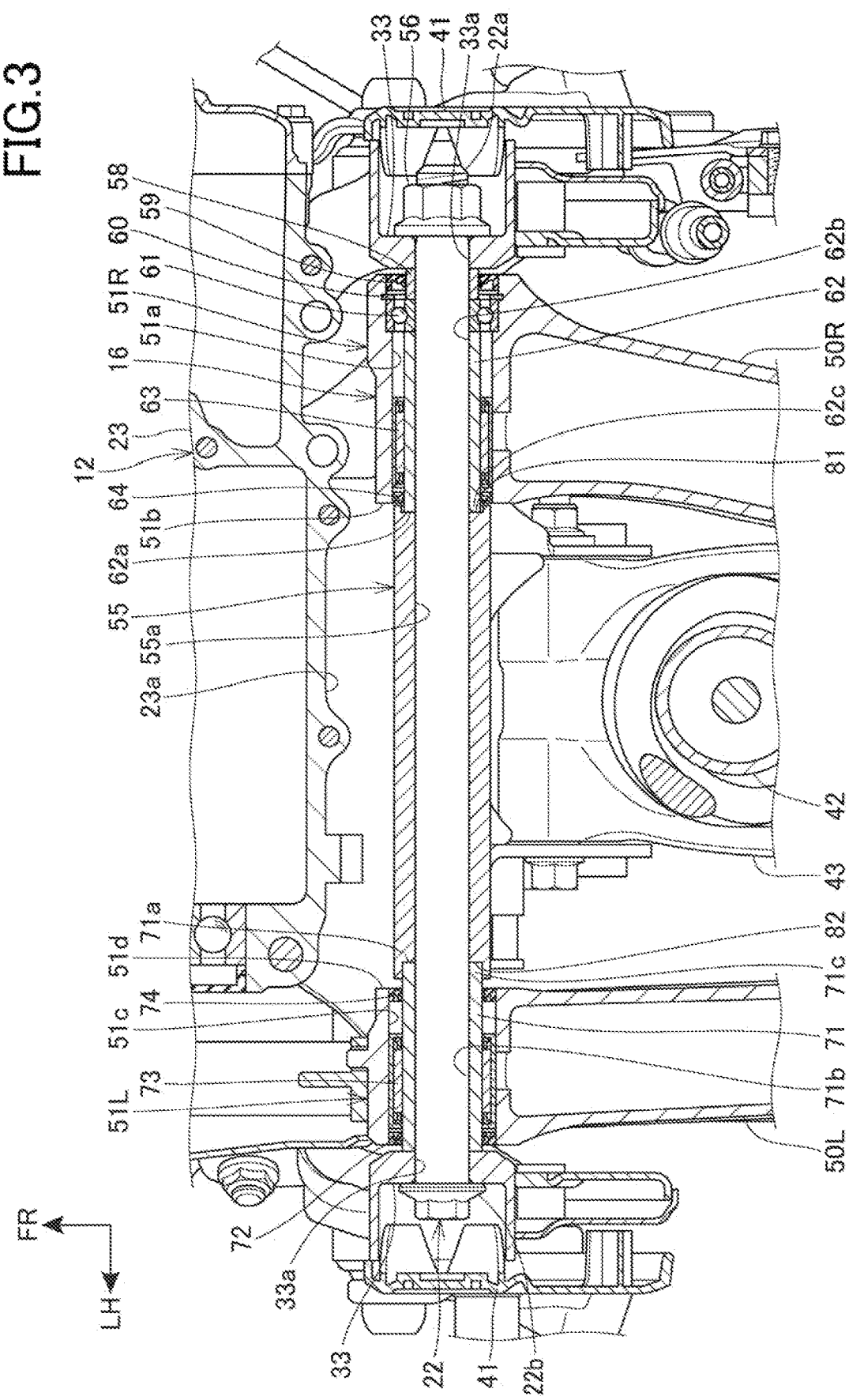
FIG. 3 is a cross-sectional view taken along line III-III in FIG. 1.
Figure 4:
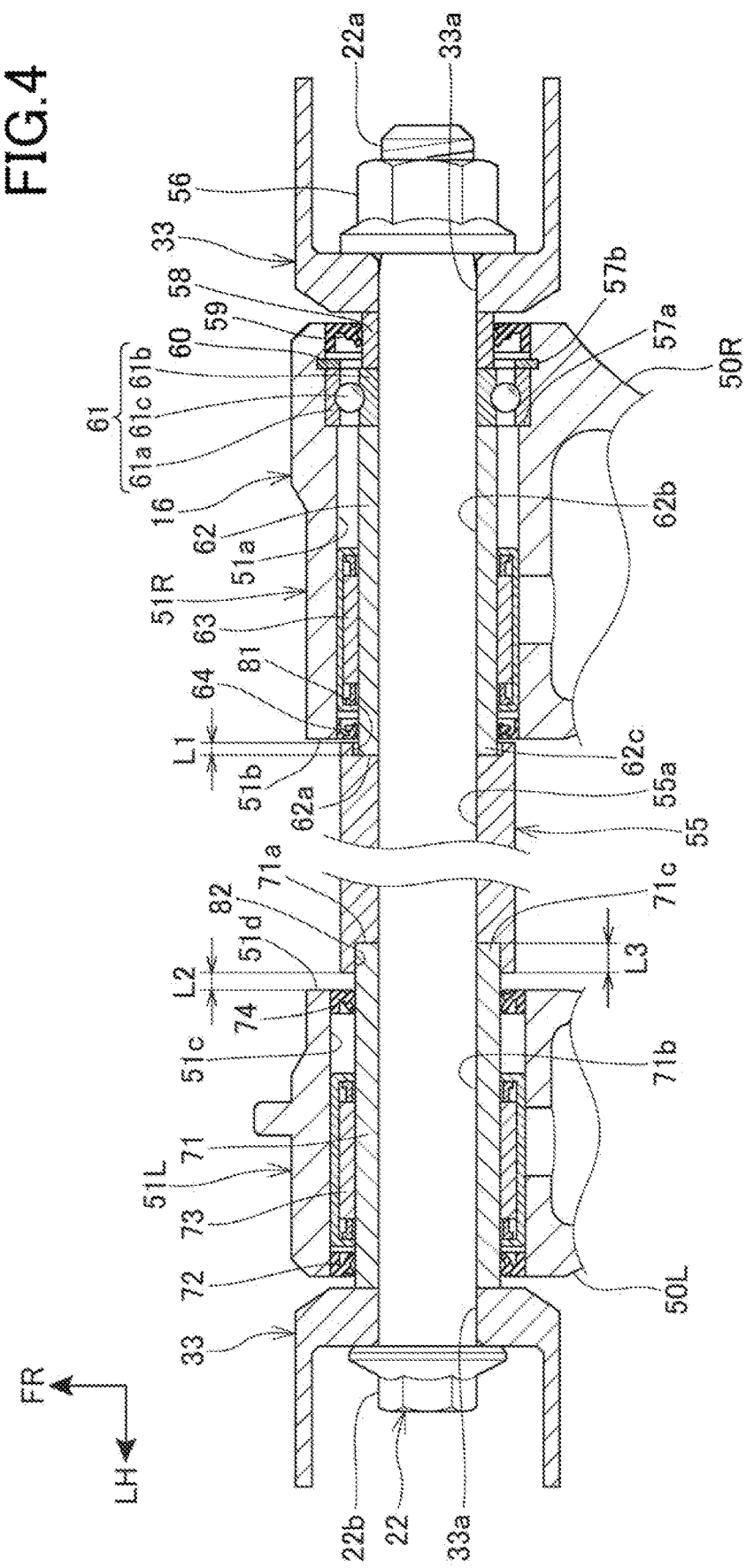
FIG. 4 is an enlarged cross-sectional view of a structure where a swing arm 16 is supported on a pivot shaft.

FIG. 3 is cross-sectional view taken along line III-III in FIG. 1. FIG. 4 is an enlarged cross-sectional view of a structure where the swing arm 16 is supported on the pivot shaft 22. In FIG. 3, an internal structure of the crankcase 23 is not shown.

With reference to FIGS. 3 and 4, the swing arm 16 is disposed such that the one-side pivot portion 51R and the other-side pivot portion 51L are located between the left and right pivot frames 33 in the vehicle width direction.

The pivot shaft 22 is a bolt-shaped shaft configured to connect the left and right pivot frames 33 to each other in the vehicle width direction.

The swing arm 16 swings up and down around the pivot shaft 22 passed through the one-side pivot portion 51R and the other-side pivot portion 51L.

The pivot shaft 22 includes a screw 22a to which a nut 56 is fastened at one end portion in a shaft direction, and a bolt head 22b at the other end portion in the shaft direction.

The pivot shaft 22 is passed through support holes 33a provided in the left and right pivot frames 33.

The pivot shaft 22 is passed through the support hole 33a of one pivot frame 33 from the outside in the vehicle width direction, and penetrates the support hole 33a of the other pivot frame 33 from the inside in the vehicle width direction.

The bolt head 22b abuts on one pivot frame 33 from the outside in the vehicle width direction, and the nut 56 fastened to the screw 22a abuts on the other pivot frame 33 from the outside in the vehicle width direction.

The one-side pivot portion 51R of the swing arm 16 is a tubular portion extending in the vehicle width direction. On an inner peripheral portion 51a of the one-side pivot portion 51R, a cylindrical spacer 58, a ring-shaped outer seal member 59, a ring-shaped stopper 60, a first bearing 61, a cylindrical one-side collar member 62, a second bearing 63, and a ring-shaped inner seal member 64 are provided in this order from the outside in the vehicle width direction.

The first bearing 61 is formed to have a larger diameter than the second bearing 63 in the shaft direction, and thus the inner peripheral portion 51a is provided with a step portion 57a. Further, an annular groove 57b is provided on an outer side in the vehicle width direction of the step portion 57a in the inner peripheral portion 51a, the annular groove 57b being engaged with the stopper 60.

The first bearing 61 is a ball bearing including an outer ring 61a, an inner ring 61b provided inside the outer ring 61a, and a ball 61c disposed between the outer ring 61a and the inner ring 61b.

The first bearing 61 is positioned in the shaft direction (vehicle width direction) when the outer ring 61a abuts on the step portion 57a from the outside in the vehicle width direction. In addition, the first bearing 61 is position in the shaft direction when the stopper 60 abuts on the outer ring 61a from the outside in the vehicle width direction. In other words, the first bearing 61 is fixed in the inner peripheral portion 51a so as to be movable in the shaft direction.

The outer seal member 59 is mounted on the inner peripheral portion 51a when an outer peripheral portion of the outer seal member 59 is fitted with an outer end portion of the inner peripheral portion 51a in the vehicle width direction.

The spacer 58 is mounted on the one-side pivot portion 51R by being fitted with the inner peripheral portion of the outer seal member 59. An inner end in the shaft direction of the spacer 58 abuts on the inner ring 61b of the first bearing 61. An outer end in the shaft direction of the spacer 58 protrudes outward in the vehicle width direction relative to an outer end surface in the vehicle width direction of the one-side pivot portion 51R, and abuts on an inside surface of the right pivot frame 33.

The second bearing 63 is a roller bearing in which a plurality of rollers are supported on an inner peripheral portion of a cylindrical case. The second bearing 63 is disposed to be separated inward in the vehicle width direction from the first bearing 61. The second bearing 63 is press-fitted into the inner peripheral portion 51a.

The inner seal member 64 is mounted on the inner peripheral portion 51a when the outer peripheral portion of the inner seal member 64 is fitted with an inner end portion in the vehicle width direction of the inner peripheral portion 51a.

The one-side collar member 62 is passed through the inner peripheral portion of the inner seal member 64 from the inside in the vehicle width direction, and is fitted with the inner peripheral portion of the inner seal member 64 and the inner peripheral portion of the second bearing 63.

An outer end in the shaft direction of the one-side collar member 62 abuts on the inner ring 61b of the first bearing 61. The inner ring 61b is an abutting portion on which the one-side collar member 62 abuts in the shaft direction.

An inner end 62a in the shaft direction of the one-side collar member 62 protrudes inward in the vehicle width direction relative to an inner end surface 51b in the vehicle width direction of the one-side pivot portion 51R.

The pivot shaft 22 is passed through an inner peripheral portion 62b of the one-side collar member 62.

The other-side pivot portion 51L of the swing arm 16 is a tubular portion extending in the vehicle width direction. An inner peripheral portion 51c of the other-side pivot portion 51L is provided with a cylindrical other-side collar member 71, a ring-shaped outer seal member 72, a third bearing 73, and an inner seal member 74 in this order from the outside in the vehicle width direction.

The outer seal member 72 is mounted on the inner peripheral portion 51c when an outer peripheral portion of the outer seal member 72 is fitted with an outer end portion in the vehicle width direction of the inner peripheral portion 51c.

The inner seal member 74 is mounted on the inner peripheral portion 51c when an outer peripheral portion of the inner seal member 74 is fitted with an inner end portion in the vehicle width direction of the inner peripheral portion 51c.

The third bearing 73 is a roller bearing in which a plurality of rollers are supported on the inner peripheral portion of the cylindrical case. The third bearing 73 is disposed between the outer seal member 72 and the inner seal member 74.

The third bearing 73 is press-fitted into the inner peripheral portion 51c.

The other-side collar member 71 is fitted with an inner peripheral portion of the outer seal member 72, an inner peripheral portion of the third bearing 73, and an inner peripheral portion of the inner seal member 74.

An outer end in the shaft direction of the other-side collar member 71 protrudes outward in the vehicle width direction from an outer end surface in the vehicle width direction of the other-side pivot portion 51L, and abuts on an inside surface of the left pivot frame 33.

An inner end 71a in the shaft direction of the other-side collar member 71 protrudes inward in the vehicle width direction relative to an inner end surface 51d in the vehicle width direction of the other-side pivot portion 51L.

The pivot shaft 22 is passed through an inner peripheral portion 71b of the other-side collar member 71.

The distance collar 55 has a cylindrical shape extending in the shaft direction of the pivot shaft 22. The distance collar 55 has a cylindrical shape that is disposed coaxially with the one-side collar member 62 and the other-side collar member 71.

The pivot shaft 22 is passed through an inner peripheral portion 55a of the distance collar 55.

The distance collar 55 is sandwiched between the one-side collar member 62 and the other-side collar member 71 in the shaft direction.

An outer diameter of the distance collar 55 is larger than an outer diameter of the one-side collar member 62 and an outer diameter of the other-side collar member 71.

One end portion in the shaft direction of the distance collar 55 is provided with one-side fitting portion 81 that is fitted with an inner shaft end portion 62c in the vehicle width direction of the one-side collar member 62.

The other end portion in the shaft direction of the distance collar 55 is provided with the other-side fitting portion 82 that is fitted with an inner shaft end portion 71c in the vehicle width direction of the other-side collar member 71.

The one-side fitting portion 81 is a circular hole portion that is formed on an end surface in the shaft direction of the distance collar 55. The one-side fitting portion 81 is fitted with an outer periphery of the shaft end portion 62c of the one-side collar member 62, and abuts on the shaft end portion 62c in the shaft direction.

The other-side fitting portion 82 is a circular hole portion that is formed on an end surface in the shaft direction of the distance collar 55. The other-side fitting portion 82 is fitted with an outer periphery of the shaft end portion 71c of the other-side collar member 71, and abuts on the shaft end portion 71c in the shaft direction.

The swing arm 16 is mounted on the left and right pivot frames 33 by the pivot shaft 22.

Specifically, the pivot shaft 22 is passed through the support hole 33a of the left pivot frame 33, the other-side collar member 71, the distance collar 55, the one-side collar member 62, the inner peripheral portion of the inner ring 61b of the first bearing 61, the inner peripheral portion of the spacer 58, and the support hole 33a of the right pivot frame 33, and is fastened to the pivot frame 33 by the nut 56.

Due to a fastening shaft force between the pivot shaft 22 and the nut 56, the other-side collar member 71, the distance collar 55, the one-side collar member 62, the inner ring 61b, and the spacer 58 are sandwiched between the left and right pivot frames 33 in the shaft direction. Thus, the other-side collar member 71, the distance collar 55, the one-side collar member 62, the inner ring 61b, and the spacer 58 are integrally fixed to the left and right pivot frames 33 so as not to be rotatable.

The distance collar 55 is a member that transmits the fastening shaft force between the pivot shaft 22 and the nut 56 between the one-side collar member 62 and the other-side collar member 71.

The swing arm 16 swings up and down the one-side collar member 62 and the other-side collar member 71, which are fixed on the pivot shaft 22, through the second bearing 63 and the third bearing 73 by the fastening shaft force. Further, the swing arm 16 swings up and down through the first bearing 61 fixed on the pivot shaft 22 by the fastening shaft force.

The distance collar 55 is exposed outward between the one-side collar member 62 and the other-side collar member 71 in a state where the pivot shaft 22 is passed through the inner peripheral portion 55a. The entire outer peripheral surface of the distance collar 55 is exposed outward. In other words, the distance collar 55 is not supported on a member that covers the distance collar 55 from surroundings. Therefore, the distance collar 55 can be supported with a simple configuration. In addition, since the member provided for supporting and covering the distance collar 55 cannot be provided, the weight can be reduced.

Further, the swing arm 16 can be diverted to a model different from the saddle-ride vehicle 10. For example, the swing arm 16 can be mounted on a model in which the crankcase is provided with a distance collar support hole for supporting the distance collar. In this case, the swing arm 16 can be diverted to a model different from the saddle-ride vehicle 10 by replacement of a distance collar designed according to the distance collar support hole with the distance collar 55. Alternatively, when the distance collar 55 of the present embodiment is used in the swing arm supported on the distance collar provided on the crankcase, the swing arm 16 can be diverted to a vehicle that cannot support the distance collar on the crankcase.

FIG. 4 shows one-side fitting depth L1 which is a fitting depth of the one-side collar member 62 with respect to the one-side fitting portion 81 and a separation distance L2 between the inner end surface 51d in the vehicle width direction of the other-side pivot portion 51L and the outer end in the vehicle width direction of the other-side fitting portion 82.

In the state where the swing arm 16 is mounted on the pivot frame 33, the separation distance L2 is larger than the one-side fitting depth L1.

In addition, FIG. 4 shows the other-side fitting depth L3, which is a fitting depth of the other-side collar member 71 with respect to the other-side fitting portion 82.

In the state where the swing arm 16 is mounted on the pivot frame 33, the other-side fitting depth L3 is larger than the one-side fitting depth L1 and the separation distance L2.

An example of a procedure of assembling the swing arm 16 to the pivot frame 33 will be described below with reference to FIG. 4.

First, before the swing arm 16 is disposed between the left and right pivot frames 33, the distance collar 55 is temporarily assembled between the one-side collar member 62 and the other-side collar member 71.

Specifically, the other-side collar member 71 is shifted outward in the vehicle width direction with respect to the state of FIG. 4, and the one-side fitting portion 81 of the distance collar 55 is fitted with the inner shaft end portion 62c in the vehicle width direction of the one-side collar member 62 in this state.

Next, the other-side collar member 71 is shifted inward in the vehicle width direction to move to the position shown in FIG. 4, and the shaft end portion 71c of the other-side collar member 71 is fitted with the other-side fitting portion 82 of the distance collar 55. Thus, the distance collar 55 is in the state of being temporarily assembled between the one-side collar member 62 and the other-side collar member 71.

In such a procedure, since the separation distance L2 is larger than the one-side fitting depth L1, when the one-side fitting portion 81 is fitted with the shaft end portion 62c of the one-side collar member 62, the other-side collar member 71 is slid outward such that the end surface 51d of the other-side pivot portion 51L is flush with the inner end 71a of the other-side collar member 71, and the distance collar 55 can be disposed between the one-side collar member 62 and the other-side pivot portion 51L. Then, the other-side collar member 71 is slid inward, and thus the other-side collar member 71 can be fitted with the distance collar 55 and temporarily assembled. Therefore, the distance collar 55 is temporarily assembled with ease.

Subsequently, the swing arm 16 with the distance collar 55 temporarily assembled is disposed between the left and right pivot frames 33, and is fastened to the pivot frame 33 by the pivot shaft 22 and the nut 56.

FIG. 5 is a cross-sectional view illustrating the temporary assembly of the swing arm 16. FIG. 5 is a cross-sectional view of the distance collar 55 as viewed from a rear side.

When the other-side collar member 71 is largely shifted in the shaft direction in the state where the distance collar 55 is temporarily assembled to the swing arm 16, it is assumed that the fitting of the one-side fitting portion 81 with the other-side fitting portion 82 is released and the distance collar 55 drops out.

In the present embodiment, since the other-side fitting depth L3 is larger than the one-side fitting depth L1, when the other-side collar member 71 is shifted outward in the vehicle width direction, the fitting of the one-side fitting portion 81 with the one-side collar member 62 is released before the fitting of the other-side fitting portion 82 with the other-side collar member 71 is released, and the fitting of the other-side fitting portion 82 is easily maintained.

Thus, even when the distance collar 55 is about to drop out due to the shift of the other-side collar member 71, the one-side fitting portion 81 is caught by the one-side collar member 62 as shown in FIG. 5. Therefore, it is possible to prevent the dropout of the distance collar 55 during the temporary assembly.

Further, since the other-side fitting depth L3 is larger than the separation distance L2, the fitting of the other-side fitting portion 82 with the other-side collar member 71 is difficult to be released. Therefore, it is possible to prevent the dropout of the distance collar 55 during the temporary assembly.

As described above, according to the embodiment of the present invention, the saddle-ride vehicle 10 includes the pair of left and right pivot frames 33 that are vehicle body frames and the swing arm 16 that is supported on the pivot frames 33 through the pivot shaft 22 in a swingable manner, and the swing arm 16 includes the one-side pivot portion 51R that is provided on one side of the left and right sides to be supported on the pivot shaft 22, the other-side pivot portion 51L that is provided on the other side of the left and right sides to be supported on the pivot shaft 22, the tubular distance collar 55 that is disposed between the one-side pivot portion 51R and the other-side pivot portion 51L and through which the pivot shaft 22 is passed. The one-side pivot portion 51R is provided with the tubular one-side collar member 62 through which the pivot shaft 22 is passed, the other-side pivot portion 51L is provided with the tubular other-side collar member 71 through which the pivot shaft 22 is passed, the distance collar 55 is interposed between the one-side collar member 62 and the other-side collar member 71, and the distance collar 55 is exposed outward between the one-side collar member 62 and the other-side collar member 71 separated from each other to the left and right, in the state where the pivot shaft 22 is passed through the distance collar 55.

With such a configuration, since the distance collar 55 is supported on the pivot shaft 22 passed through the distance collar 55 and is exposed outward between the one-side collar member 62 and the other-side collar member 71, the distance collar 55 is not supported on other members, for example, the crankcase 23. Therefore, the distance collar 55 can be supported with a simple structure, and thus the swing arm 16 can be easily diverted.

Further, the one-side pivot portion 51R and the other-side pivot portion 51L are interposed between the left and right pivot frames 33, and the one-side collar member 62, the distance collar 55, and the other-side collar member 71 are fixed so as not to be rotatable by the shaft force of the pivot shaft 22 to be fastened to the left and right pivot frames 33.

With such a configuration, since the distance collar 55 is interposed between the one-side collar member 62 and the other-side collar member 71, the one-side collar member 62 and the other-side collar member 71 can be fixed so as not to be rotatable by the shaft force of the pivot shaft 22. Therefore, the swing arm 16 can be supported in a swingable manner through the one-side collar member 62 and the other-side collar member 71. In addition, since the distance collar 55 does not rotate when the swing arm 16 swings, other vehicle body components can be easily disposed near the distance collar 55.

In addition, the distance collar 55 includes the one-side fitting portion 81 that is fitted with the shaft end portion 62c of the one-side collar member 62 and the other-side fitting portion 82 that is fitted with the shaft end portion 71c of the other-side collar member 71.

With such a configuration, since the distance collar 55 can be temporarily assembled to the one-side collar member 62 and the other-side collar member 71 through the one-side fitting portion 81 and the other-side fitting portion 82, the swing arm 16 can be easily assembled.

Further, the distance collar 55 has an outer diameter larger than a diameter of the one-side collar member 62 and a diameter of the other-side collar member 71, the one-side fitting portion 81 is fitted with the outer periphery of the one-side collar member 62, and the other-side fitting portion 82 is fitted with the outer periphery of the other-side collar member 71.

With such a configuration, the distance collar 55 can be fitted with the one-side collar member 62 and the other-side collar member 71 with a simple structure.

Further, before the swing arm 16 is assembled between the left and right pivot frames 33, the one-side collar member 62 abuts on the inner ring 61b, which is an abutting portion in the one-side pivot portion 51R, in the shaft direction, and protrudes inward in the vehicle width direction from the inner end surface 51b in the vehicle width direction of the one-side pivot portion 51R, and the other-side collar member 71 is fitted with the other-side pivot portion 51L and is movable in the shaft direction, and when the swing arm 16 is assembled between the left and right pivot frame 33, the separation distance L2 between the inner end surface 51d in the vehicle width direction of the other-side pivot portion 51L and the outer end in the vehicle width direction of the other-side fitting portion 82 is larger than the one-side fitting depth L1 that is the depth of the one-side collar member 62 with respect to the one-side fitting portion 81.

With such a configuration, the one-side fitting portion 81 is fitted with the one-side collar member 62 protruding inward in the vehicle width direction from the end surface 51b of the one-side pivot portion 51R, and then the other-side collar member 71 moves in the shaft direction such that the other-side collar member 71 is fitted with the other-side fitting portion 82, whereby the distance collar 55 can be temporarily assembled between the one-side collar member 62 and the other-side collar member 71. In addition, since the separation distance L2 is larger than the one-side fitting depth L1, the temporary assembly of the distance collar 55 is hardly hindered by the other-side pivot portion 51L, and the one-side fitting portion 81 can be easily fitted with the one-side collar member 62.

In addition, the other-side fitting depth L3, which is the fitting depth of the other-side collar member 71 with respect to the other-side fitting portion 82, is larger than the one-side fitting depth L1.

With such a configuration, since the other-side fitting depth L3 is larger than the one-side fitting depth L1, even when the other-side collar member 71 is shifted in the shaft direction and the one-side fitting portion 81 is disengaged in the temporarily assembled state, the fitting of the other-side fitting portion 82 can be easily maintained, and the dropout of the distance collar 55 can be prevented. Therefore, the assembly work is easy.

Further, the other-side fitting depth L3 is larger than the separation distance L2.

With such a configuration, even when the other-side collar member 71 is shifted in the shaft direction, the fitting of the other-side collar member 71 with the other-side fitting portion 82 can be easily maintained. Therefore, the dropout of the distance collar 55 can be effectively prevented.

The above-described embodiment merely represents one aspect of the present invention, and the present invention is not limited to the above-described embodiment.

In the above-described embodiment, the motorcycle is described as an example of the saddle-ride vehicle 10, but the present invention is not limited thereto. The present invention is applicable to a three-wheeled saddle-ride vehicle including two front wheels or two rear wheel and saddle-ride vehicles including four or more wheels.

[Configurations Supported by Embodiment Described Above]

The above-described embodiment is a specific example of the following configurations.

(Configuration 1) A saddle-ride vehicle including: a pair of left and right vehicle body frames; and a swing arm supported on the vehicle body frames through a pivot shaft in a swingable manner, the swing arm including a one-side pivot portion, an other-side pivot portion, and a distance collar, the one-side pivot portion being provided on one side of left and right sides to be supported on the pivot shaft, the other-side pivot portion being provided on the other side of the left and right sides to be supported on the pivot shaft, the distance collar having a tubular shape and being disposed between the one-side pivot portion and the other-side pivot portion, the pivot shaft being passed through the distance collar, the one-side pivot portion being provided with a one-side collar member, the one-side collar member having a tubular shape, the pivot shaft being passed through the one-side collar member, the other-side pivot portion being provided with an other-side collar member, the other-side collar member having a tubular shape, the pivot shaft being passed through the other-side collar member, the distance collar being interposed between the one-side collar member and the other-side collar member, wherein the distance collar is exposed outward between the one-side collar member and the other-side collar member in a state where the pivot shaft is passed through the distance collar, the one-side collar member and the other-side collar member being separated from each other to left and right.

With such a configuration, since the distance collar is supported on the pivot shaft passed through the distance collar and is exposed outward between the one-side collar member and the other-side collar member, the distance collar is not supported on other members, for example, the crankcase. Therefore, the distance collar can be supported with a simple structure, and thus the swing arm can be easily diverted.

(Configuration 2) The saddle-ride vehicle according to Configuration 1, wherein the one-side pivot portion and the other-side pivot portion are interposed between the left and right vehicle body frames, and the one-side collar member, the distance collar, and the other-side collar member are fixed so as not to be rotatable by a shaft force of the pivot shaft to be fastened to the left and right vehicle body frames.

With such a configuration, since the distance collar is interposed between the one-side collar member and the other-side collar member, the one-side collar member and the other-side collar member can be fixed so as not to be rotatable by the shaft force of the pivot shaft. Therefore, the swing arm can be supported in a swingable manner through the one-side collar member and the other-side collar member. In addition, since the distance collar does not rotate when the swing arm swings, other vehicle body components can be easily disposed near the distance collar.

(Configuration 3) The saddle-ride vehicle according to Configuration 1 or 2, wherein the distance collar includes a one-side fitting portion and an other-side fitting portion, the one-side fitting portion being fitted with a shaft end portion of the one-side collar member, the other-side fitting portion being fitted with a shaft end portion of the other-side collar member.

With such a configuration, since the distance collar can be temporarily assembled to the one-side collar member and the other-side collar member through the one-side fitting portion and the other-side fitting portion, the swing arm can be easily assembled.

(Configuration 4) The saddle-ride vehicle according to Configuration 3, wherein the distance collar has an outer diameter larger than a diameter of the one-side collar member and a diameter of the other-side collar member, the one-side fitting portion is fitted with an outer periphery of the one-side collar member, and the other-side fitting portion is fitted with an outer periphery of the other-side collar member.

With such a configuration, the distance collar can be fitted with the one-side collar member and the other-side collar member with a simple structure.

(Configuration 5) The saddle-ride vehicle according to Configuration 4, wherein before the swing arm is assembled between the left and right vehicle body frames, the one-side collar member abuts in a shaft direction on an abutting portion in the one-side pivot portion, the one-side collar member protruding inward in a vehicle width direction from an inner end surface in the vehicle width direction of the one-side pivot portion, and the other-side collar member is fitted with the other-side pivot portion, the other-side collar member being movable in the shaft direction, and when the swing arm is assembled between the left and right vehicle body frames, a separation distance between an inner end surface in the vehicle width direction of the other-side pivot portion and an outer end in the vehicle width direction of the other-side fitting portion is larger than a one-side fitting depth, the one-side fitting depth being a depth of the one-side collar member with respect to the one-side fitting portion.

With such a configuration, the one-side fitting portion is fitted with the one-side collar member protruding inward in the vehicle width direction from the end surface of the one-side pivot portion, and then the other-side collar member moves in the shaft direction such that the other-side collar member is fitted with the other-side fitting portion, whereby the distance collar can be temporarily assembled between the one-side collar member and the other-side collar member. In addition, since the separation distance is larger than the one-side fitting depth, the temporary assembly of the distance collar is hardly hindered by the other-side pivot portion, and the one-side fitting portion can be easily fitted with the one-side collar member.

(Configuration 6) The saddle-ride vehicle according to Configuration 5, wherein an other-side fitting depth is larger than the one-side fitting depth, the other-side fitting depth being a fitting depth of the other-side collar member with respect to the other-side fitting portion.

With such a configuration, since the other-side fitting depth is larger than the one-side fitting depth, even when the other-side collar member is shifted in the shaft direction and the one-side fitting portion is disengaged in the temporarily assembled state, the fitting of the other-side fitting portion can be easily maintained, and the dropout of the distance collar can be prevented. Therefore, the assembly work is easy.

(Configuration 7) The saddle-ride vehicle according to Configuration 6, wherein the other-side fitting depth is larger than the separation distance.

With such a configuration, even when the other-side collar member is shifted in the shaft direction, the fitting of the other-side collar member with the other-side fitting portion can be easily maintained. Therefore, the dropout of the distance collar can be effectively prevented.

REFERENCE SIGNS LIST

10 saddle-ride vehicle
16 swing arm 22 pivot shaft
33 pivot frame (vehicle body frame)
51b end surface (inner end surface in vehicle width direction of one-side pivot portion)
51d end surface (inner end surface in vehicle width direction of the other-side pivot portion)
51L other-side pivot portion
51R one-side pivot portion
55 distance collar
61b inner ring (abutting portion)
62 one-side collar member
62c shaft end portion (shaft end portion of one-side collar member)
71 other-side collar member
71c shaft end portion (shaft end portion of the other-side collar member)
81 one-side fitting portion
82 other-side fitting portion
L1 one-side fitting depth
L2 separation distance
L3 other-side fitting depth

What is claimed is:

1. A saddle-ride vehicle comprising:
a pair of left and right vehicle body frames; and
a swing arm supported on the vehicle body frames through a pivot shaft in a swingable manner, the swing arm including a one-side pivot portion, an other-side pivot portion, and a distance collar, the one-side pivot portion being provided on one side of left and right sides to be supported on the pivot shaft, the other-side pivot portion being provided on the other side of the left and right sides to be supported on the pivot shaft, the distance collar having a tubular shape and being disposed between the one-side pivot portion and the other-side pivot portion, the pivot shaft being passed through the distance collar, the one-side pivot portion being provided with a one-side collar member, the one-side collar member having a tubular shape, the pivot shaft being passed through the one-side collar member, the other-side pivot portion being provided with an other-side collar member, the other-side collar member having a tubular shape, the pivot shaft being passed through the other-side collar member, the distance collar being interposed between the one-side collar member and the other-side collar member, wherein the distance collar has an outer diameter larger than a diameter of the one-side collar member and a diameter of the other-side collar member, the distance collar includes a one-side fitting portion and an other-side fitting portion, the one-side fitting portion being fitted with an outer periphery of a shaft end portion of the one-side collar member, the other-side fitting portion being fitted with an outer periphery of a shaft end portion of the other-side collar member, a separation distance between an inner end surface in the vehicle width direction of the other-side pivot portion and an outer end in the vehicle width direction of the other-side fitting portion is larger than a one-side fitting depth, the one-side fitting depth being a depth of the one-side collar member with respect to the one-side fitting portion.

2. The saddle-ride vehicle according to claim 1, wherein the one-side pivot portion and the other-side pivot portion are interposed between the left and right vehicle body frames, and the one-side collar member, the distance collar, and the other-side collar member are fixed so as not to be rotatable by a shaft force of the pivot shaft to be fastened to the left and right vehicle body frames.

3. The saddle-ride vehicle according to claim 1, wherein an other-side fitting depth is larger than the one-side fitting depth, the other-side fitting depth being a fitting depth of the other-side collar member with respect to the other-side fitting portion.

4. The saddle-ride vehicle according to claim 3, wherein the other-side fitting depth is larger than the separation distance.

* * * * *